United States Patent
Czyzewski et al.

(10) Patent No.: US 10,002,692 B2
(45) Date of Patent: Jun. 19, 2018

(54) METHOD FOR MANUFACTURING A RESIN-IMPREGNATABLE SHEET-LIKE SPACER FOR A HIGHVOLTAGE COMPONENT, A SPACER MANUFACTURED ACCORDING TO THE METHOD, A HIGHVOLTAGE COMPONENT COMPRISING THE SPACER AND AN ARRANGEMENT FOR PERFORMING THE METHOD

(71) Applicant: ABB Schweiz AG, Baden (CH)

(72) Inventors: Jan Czyzewski, Cracow (PL); Ansgar Dais, Dietikon (CH); Urs Kruesi, Wiesendangen (CH)

(73) Assignee: ABB Schweiz AG, Baden (CH)

( * ) Notice: Subject to any disclaimer, the term of this patent is extended or adjusted under 35 U.S.C. 154(b) by 0 days. days.

(21) Appl. No.: 15/291,452

(22) Filed: Oct. 12, 2016

(65) Prior Publication Data

US 2017/0032874 A1     Feb. 2, 2017

Related U.S. Application Data

(63) Continuation of application No. PCT/EP2015/056825, filed on Mar. 30, 2015.

(30) Foreign Application Priority Data

Apr. 14, 2014    (EP) .................................... 14164603

(51) Int. Cl.
    *H01B 17/00*      (2006.01)
    *H01B 17/28*      (2006.01)
    (Continued)

(52) U.S. Cl.
    CPC ............... *H01B 17/28* (2013.01); *B26F 1/20* (2013.01); *B29C 55/08* (2013.01);
    (Continued)

(58) Field of Classification Search
    CPC ........ H01B 17/28; H01B 19/00; H01B 19/04; H01B 17/00; B26F 1/20; B26F 1/22;
    (Continued)

(56) References Cited

U.S. PATENT DOCUMENTS 3,550,826 A * 12/1970 Salmela ................. D01D 5/423
                                                264/DIG. 47
3,642,967 A     2/1972 Doll
    (Continued)

FOREIGN PATENT DOCUMENTS

EP          0021017 A1     1/1981
EP          1771866 B1    12/2009
EP          2203922 B1    11/2011

OTHER PUBLICATIONS

European Patent Office, International Search Report & Written Opinion issued in corresponding Application No. PCT/EP2015/056825, dated Oct. 27, 2015, 14 pp.
(Continued)

*Primary Examiner* — Angel R Estrada
(74) *Attorney, Agent, or Firm* — Taft Stettinius & Hollister LLP (57) ABSTRACT

The method is provided for manufacturing a perforated sheet-like high-voltage insulating spacer for a high-voltage component, which component comprises a field grading condenser core with the spacer which is wound in spiral form around an axis, with electrically conducting layers which are inserted between successive windings of the spacer, and with a polymeric matrix which penetrates the spacer and which embeds the spacer and the layers. The method comprises at least steps as follows: an electrically insulating tape, and the patterned tape is expanded at right angle to the cutting lines in order to form a spacer with a perforated three-dimensional lattice structure. The combined effect of cutting a tape and expanding the cutted tape allows (Continued)

the formation of spacers with a manifold of sizes which exceed the size of the tape in function of manufacturing parameters, in particular in function of the configuration of the pattern and the magnitude of the expansion.

20 Claims, 4 Drawing Sheets (51) Int. Cl.
  *B26F 1/20* (2006.01)
  *B29C 55/08* (2006.01)
  *H01B 19/04* (2006.01)
  *B29C 63/00* (2006.01)
  *H01B 19/00* (2006.01)
  *B29L 31/34* (2006.01)

(52) U.S. Cl.
  CPC ......... *B29C 63/0073* (2013.01); *H01B 19/00* (2013.01); *H01B 19/04* (2013.01); *B29C 2793/0081* (2013.01); *B29L 2031/3412* (2013.01)

(58) Field of Classification Search
  CPC ................ B29C 55/08; B29C 63/0073; B29C 2793/0081; B29C 55/085; B29L 2031/3412
  USPC ...... 174/137 R, 138 R, 138 F, 135; 428/136, 428/98; 264/138, 154, 288.8
  See application file for complete search history.

(56) References Cited

U.S. PATENT DOCUMENTS

| 3,826,165 | A |   | 7/1974 | Currie et al. |
| 5,667,871 | A | * | 9/1997 | Goodrich ................. B31C 5/00 428/136 |
| 6,706,228 | B2 | * | 3/2004 | Mackay ................. B29C 55/18 264/154 |
| 6,843,949 | B2 | * | 1/2005 | Brady .................... B29C 55/18 264/288.8 |
| 7,923,092 | B2 | * | 4/2011 | Rockwell ................. B26F 1/22 428/192 |
| 8,486,507 | B2 | * | 7/2013 | De Luca ............ B29C 44/5654 428/136 |
| 9,266,290 | B2 | * | 2/2016 | Khan .................... B29C 43/203 |

OTHER PUBLICATIONS

European Patent Office, Extended Search Report issued in corresponding Application No. 14164603.4, dated Aug. 21, 2014, 7 pp.

* cited by examiner

METHOD FOR MANUFACTURING A RESIN-IMPREGNATABLE SHEET-LIKE SPACER FOR A HIGHVOLTAGE COMPONENT, A SPACER MANUFACTURED ACCORDING TO THE METHOD, A HIGHVOLTAGE COMPONENT COMPRISING THE SPACER AND AN ARRANGEMENT FOR PERFORMING THE METHOD

TECHNICAL FIELD

The invention relates to a method for manufacturing a perforated, sheet-like high-voltage insulating spacer for a high-voltage component comprising a field-grading condenser core with the spacer which is wound in spiral form around an axis, with electrically conducting layers which are inserted between successive windings of the spacer, and with a polymeric matrix which penetrates the spacer and which embeds the spacer and the layers according to the introductory part of claim 1. The invention further relates to a high-voltage component comprising a field-grading condenser core with a spacer manufactured according to the method.

Known high-voltage (HV) components with field-grading properties, like HV bushings, are operated with rated voltages between 10 kV and 1200 kV, typically between 30 kV and 550 kV, and are each identified with a field-grading condenser which usually is manufactured in resin impregnated paper (RIP) or in resin impregnated synthetics (RIS) technology. In each case a number of layers of a perforated sheet-like high-voltage insulating spacer is wound onto a mandrel of cylindrical shape. During the winding, when defined diameters of the wound spacer are achieved, electrically conducting layers, typically in the form of sheets of aluminum foil, are inserted between the layers of the spacer to form cylindrical field-grading layers. The number, the insertion diameters and the dimensions of the field grading layers are adjusted to the size of the HV component and to its performance parameters so as to ensure a proper grading of the electric field in the HV component. The mandrel together with a wound core comprising the wound spacer and the enclosed field-grading layers are placed in a cylindrical mould which is filled with hardenable resin. During the filling process the spacer is impregnated with the resin. Following the complete filling and impregnation of the wound core the resin hardening process is carried out. The hardened resin together with the spacer and the conductive layers forms a material with high mechanical resistance and good electrical insulating properties.

The resins typically used for the process are unfilled epoxy resin for the RIP cores and epoxy resin filled with particles, in particular powders and fibres preferably based on an inorganic substance like $SiO_2$, $Al_2O_3$, BN, AlN, BeO, $TiB_2$, $TiO_2$, SiC, SiN, B4C, ZnO or the like or mixtures thereof, for the RIS cores. The material used as the spacer in the RIP type cores is a creped electrical-grade kraft paper (crepe paper). In case of the RIS type the spacer can be made as a mesh formed of bundles of fibers or as a solid material comprising holes.

During operation the high-voltage is applied to a grounded flange and to a high-voltage conductor of the high-voltage component and thus to the cylindrical designed field-grading condenser core. The condenser core than acts as a multi-cylinder condenser and causes a linear distribution of the high-voltage between the flange and the HV conductor. A portion of the spacer between two adjacent conductive layers resp. between the flange and an adjacent conductive layer resp. between the HV conductor and an adjacent conductive layer then is exposed to a strong electric field, typically of some kV/mm.

PRIOR ART

A perforated, sheet-like high-voltage insulating spacer for a HV component and a HV component comprising such a spacer are described in EP1771866B1 and in EP2203922B1. The known spacer typically comprises a crepe paper or a mesh-shaped tape.

Such a spacer is manufactured in a difficult, long and costly process and thus is rather expensive. In order to manufacture crepe paper the raw material, that means a flat paper, has to be completely wetted by a special solution, then creped and then dried again. The manufacturing of a mesh-shaped tape is also a complex process. As shown in EP 1 771 866 B1 it includes the step of weaving or knitting the mesh spacer material as shown in FIG. 2 or the punching of holes in order to form a spacer material as shown in FIG. 3, which additionally causes large material losses. In case of the spacer material of FIG. 3 an additional disadvantage is the fact that during the winding the sheets of the material lie flat on top of each other. The areas where the flat surfaces of the material attach to each other are very difficult to impregnate, especially when an inorganic filled resin is used for impregnation. Not impregnated areas form voids in the electric insulation of the hardened product which can cause partial discharges.

For all the spacer materials listed above the width of the material is limited by the manufacturing process. When manufacturing a bushing of a length larger than the width of the available spacer material a number of web sheets have to be fed in parallel into a winding machine. In the areas of joining of the separate sheets the electric insulation properties are typically inferior to those where the full material is used. This is because the probability of various defects of the material occurring in the joining area is increased.

EP0021017A1 discloses a process for the preparation in a continuous run of composite open-net shaped structures consisting of at least two superimposed fibrilled films. The process comprises steps as follows:

longitudinal orienting a film of a synthetic polymer, like polypropylene, by longitudinal stretching in order to get a longitudinally oriented film, fibrilling the oriented film by passing it on surfaces fitted with means, like needles or blades, for producing slits, with the formation of unfibrilled, oblique (and oriented) bands, which form an angle $\beta_0$ with the directions the slits, forming a composite assembly by superimposing at least two fibrilled films with the crossing of the oblique bands, transversal stretching of the composite assembly in order to rotate the bands and to form the open net-shaped structure in which the bands form with the original slitting direction a new angle $\beta_\in$ resp. $-\beta_\in$, with respect to the direction of the slitting, and thermostabilizing the assembly of the stretched and superimposed films.

The process is suited for the production of open-net shaped structures which are used as reinforcement of laminated materials. The process favours the formation of closed voids in the open-net shaped structures, which voids would not be impregnated with a polymer resin and thus would favour the formation of partial discharges when exposed to the high-voltage.

U.S. Pat. No. 3,826,165 specifies a process for manufacturing an open cushioning material adapted for use in packaging and protecting articles. The process comprises steps as follows:

moving an elongate thermoplastic foam sheet material, slitting in the foam material a pattern of spaced apart rows of incisions with the rows extending laterally across the sheet, and     longitudinally expanding the sheet to open the incisions and to form the open cushioning material.

The known process uses the thermoplastic foam sheet which ensures the packaging and protecting function of the open cushioning material manufactured according to this method. A foam material is not suitable for manufacturing an insulating spacer for use in a high-voltage application.

DESCRIPTION OF THE INVENTION

It is an object of the invention as described in the patent claims to specify a method for manufacturing a perforated, sheet-like high-voltage insulating spacer for a HV component in a time and cost saving manner and to provide a HV component comprising the spacer manufactured according to this method.

The invention supplies a method for manufacturing a perforated, sheet-like high-voltage insulating spacer for a HV component comprising a field grading condenser core with the spacer which is wound in spiral form around an axis, with electrically conducting layers which are inserted between successive windings of the spacer, and with a polymeric matrix which penetrates the spacer and which embeds the spacer and the layers. In the method according to the invention an electrically insulating tape is moved in a running direction, a pattern of parallel extended cutting lines is inserted into the tape, and the patterned tape is expanded at right angle to the cutting lines in order to form a spacer with a perforated three-dimensional lattice structure. Hereby "expanding at right angle" means an expansion which allows the formation of the perforated three-dimensional lattice structure and thus also comprises angles which deviate somewhat from the right angle and may vary between 80° to 100°.

The method according to the invention allows the manufacturing of a spacer for a condenser core of a high-voltage component in an easy and economic manner, since the main steps, like the insertion of a pattern with parallel extended cutting lines and the expansion of the patterned tape at right angle the cutting lines can be executed in a reliable and reproducible manner. The combined effect of cutting a tape and expanding the cutted tape allows the formation of spacers with a manifold of sizes which exceed the size of the tape in function of manufacturing parameters, in particular in function of the configuration of the pattern and of the magnitude of the expansion.

Mass-manufactured commodity material such as a tape based on a PET foil can be used as raw material for a spacer used in RIS technology. Such a material can be cut and expanded very easy and reduces the manufacturing costs of HV voltage components, in particular of HV bushings, in RIS technology essentially.

In RIP technology flat kraft transformer insulating paper can be used as a raw material for the spacer. This gives a significant cost advantage with respect to the usually used crepe paper in the manufacturing of HV components, like HV bushings. In each case the material of the spacer can be configured to withstand the formation of partial discharges in an electrical field of at least 2 kV/mm.

In a preferred first embodiment of the method according to the invention the cutting lines can be introduced parallel to the running direction of the tape. This embodiment of the method allows the production of spacers with different widths using only a tape with a smaller width and thus also allows the production of high-voltage components with different lengths of the condenser cores using only a tape with a width that is smaller than the lengths of the condenser cores. This facilitates the production of the high-voltage components remarkably and reduces the production costs essentially. Furthermore areas of joining two or more separate spacers with small width are avoided. With respect to the mechanical and the dielectrical properties of the high-voltage component such areas are inferior to those in which only one spacer is used. Thus the high-voltage component according to the invention comprises a high reliability. Furthermore during manufacturing a scrap rate due to tailoring an appropriate spacer from two or more different spacers is reduced.

In order to facilitate the expansion of the tape in the first embodiment of manufacturing process according to the invention a first plurality of these cutting lines can be inserted line by line with respect to the running direction of the tape and forms first pattern lines, wherein the cutting lines of any of the first pattern lines are spaced uniformly. In order to improve in the afore-identified process the expansion of the tape a second plurality of the cutting lines can be inserted line by line with respect to the running direction of the tape and forms second pattern lines, wherein any of the second pattern lines is arranged between two joining first pattern lines, wherein the cutting lines of any of the second pattern lines, are spaced uniformly, and wherein at least one cutting line of the second plurality of the cutting lines is arranged between two adjacent cutting lines of each of two joining first pattern lines.

In a preferred second embodiment of the method according to the invention the cutting lines can be inserted at right angle to the running direction of the tape. A spacer manufactured according to this embodiment of the method usually comprises a smaller width than the tape but compared to the tape is more extended in its running direction. In many cases the tape comprises a negligible plasticity and during expansion in its running direction reduces its width considerably. The second embodiment of the method according to the invention then is beneficial for manufacturing spacers with comparatively small widths. In many other cases the tape comprises a considerable plasticity and during expansion in its running direction can additionally be expanded at right angle to its running direction. This additional expansion maintains or even beats the width of the tape. The second embodiment of the method according to the invention then is beneficial for manufacturing spacers with a high variety of widths and starting with a slim tape. Furthermore, then the amount of tape material for the manufacturing of a spacer with a large width can be kept small.

In order to facilitate the expansion of the tape in the second embodiment of manufacturing process according to the invention a first plurality of the cutting lines can be inserted column by column with respect to the running direction of the tape and forms first pattern columns, wherein the cutting lines of any of the first pattern columns are spaced uniformly. In order to improve in the afore-identified process the expansion of the tape a second plurality of the cutting lines can be inserted column by column with respect to the running direction of the tape and forms second pattern columns, wherein any of the second pattern columns can be arranged between two joining first pattern columns, wherein the cutting lines of any of the second pattern columns are spaced uniformly, and wherein at least one of the second plurality of the cutting lines is arranged between two adjacent cutting lines of each of two joining first pattern columns.

The perforated three-dimensional structure can be flattened in order to form a spacer with a perforated two-dimensional structure. Before flattening the perforated three-dimensional structure the tape can be expanded to a maximum admissible elongation with respect to the running direction or at right angle to the running direction.

In order to facilitate and accelerate the manufacturing method according to the invention before the execution of at least one of the afore-mentioned steps, which include cutting the tape, expanding the tape and flattening the three-dimensional lattice structure, the tape can be adjusted to a temperature which allows a plastic deformation of the tape material.

After the execution of the last of the steps the tape can be adjusted to a temperature which prevents any further plastic deformation. This can be achieved with cooling, for instance in a bath, and results in the spacer which can be wound on a cylindrical spacer carrier or which can immediately be used for forming the condenser core of the HV component.

A sheet-like high-voltage insulating spacer, which is manufactured with the afore-defined method, comprises a three- or two-dimensional lattice structure with holes. When such a perforated lattice structure of the spacer is three-dimensional, the stacking of such material on top of each other during winding will produce a structure easy to be impregnated, especially with a filled resin used in RIS technology. When such a perforated lattice structure of the spacer is compressed and is only two-dimensional then the spacer is thinner than standard crepe paper, even though allowing resin penetration during impregnation. This results in increased volume fraction of the paper in the RIP material giving both cost advantage and—for reason of less exothermal heat released—processing advantage.

In an embodiment of the HV component the perforated, sheet-like high-voltage insulating spacer can comprise a three-dimensional lattice structure with openings, which are bordered with the material of the cut and expanded tape, and the polymer matrix can be based on a hardened polymer resin with an inorganic filler with an average particle size which is smaller than the average size of the openings provided in the three-dimensional lattice structure. In such a HV component the condenser core preferably is executed in RIS technology and the spacer can be manufactured from at least one of a polymer foil or a densely woven or unwoven synthetic fabric.

In a further embodiment of the HV component the perforated, sheet-like high-voltage insulating spacer can comprise a two-dimensional lattice structure with openings, which are sized smaller than the openings of the three-dimensional lattice structure and which are bordered with the material of the cut, expanded and flattened tape, and the polymer matrix can be based on a hardened unfilled polymer resin. In such a HV component the condenser core preferably is executed in RIP technology and the spacer can be manufactured from at least one of a paper or a woven or unwoven synthetic fabric. The applied spacer can further comprise passages, which are arranged between adjacent foldings of flattened material of the tape, and which are aligned at right angle to the radial direction.

An arrangement for performing the before-defined method can comprise a cylindrical member for moving an electrically insulating tape in a running direction, a cutting tool for inserting a pattern of parallel extended cutting lines into the tape, and a stretching tool for expanding the tape at right angle to the cutting lines and for forming a perforated three-dimensional lattice structure.

In a first embodiment of the arrangement the cutting tool can comprise a pair of axially aligned cooperating cutting drums for inserting the cutting lines of the pattern into the tape, wherein the cutting drums are designed as toothed wheels, wherein the teeth are realized as first knives and wherein any of the first knives of one of the two cutting drums cooperates with one of second knives which are arranged in tooth spaces of the other of the two cutting drums.

In a second embodiment of the arrangement the cutting tool can comprise:

a first pair of axially aligned cooperating cutting drums for inserting a first plurality of the cutting lines which form a first part of the pattern into the tape, wherein the cutting drums are designed as toothed wheels, wherein the teeth are realized as first knives and wherein any of the first knives of one of the two cutting drums cooperates with one of second knives which are arranged in tooth spaces of the other of the two cutting drums, and an equally designed second pair of axially aligned cooperating cutting drums for inserting a second plurality of the cutting lines and for forming a second part of the pattern into the tape, wherein the second part of the pattern is identical in shape with the first part of the pattern but is shifted lengthwise and crosswise with respect to the first part.

The arrangement can further comprise a tool for flattening the three-dimensional lattice structure to a perforated two-dimensional lattice structure.

BRIEF DESCRIPTION OF THE DRAWINGS

These and other characteristics of the invention will be clear from the following description of preferential forms, given as non-restrictive examples, with reference to the attached drawings, wherein:

FIG. 1 is a top view on an arrangement for manufacturing a spacer according to the invention, FIG. 2 a side view on the arrangement according to FIG. 1, FIG. 3 an enlargement of a black-rimmed section III of the arrangement shown in FIG. 2, FIG. 4 an enlargement of a black-rimmed range IV of a tape shown in FIG. 1 and moved in a running direction, FIG. 5 a view on a black-rimmed section V of the range IV in which section after a moderate stretching of the tape by means of an expansion perpendicular to the running direction the tape has changed to a first embodiment of the spacer according to the invention and comprises a first three-dimensional lattice structure, FIG. 6 a view on a black-rimmed subsection VI of the section V after a strong stretching of the first embodiment of the spacer by means of an expansion perpendicular to the running direction for forming a second embodiment of the spacer according to the invention comprising a second three-dimensional lattice structure, FIG. 7 a view on the subsection VI shown in FIG. 6 after flattening the second three-dimensional lattice structure for forming a third embodiment of the spacer according to the invention, FIG. 8 an enlargement of the range IV of a fourth embodiment of the spacer according to the invention, and FIG. 9 a top view on a fifth embodiment of the spacer according to the invention.

DETAILED DESCRIPTION OF PREFERENTIAL EMBODIMENTS OF THE INVENTION

In the figures same reference symbols are used for identical parts and repetitive reference symbols may be omitted.

Figure 1:
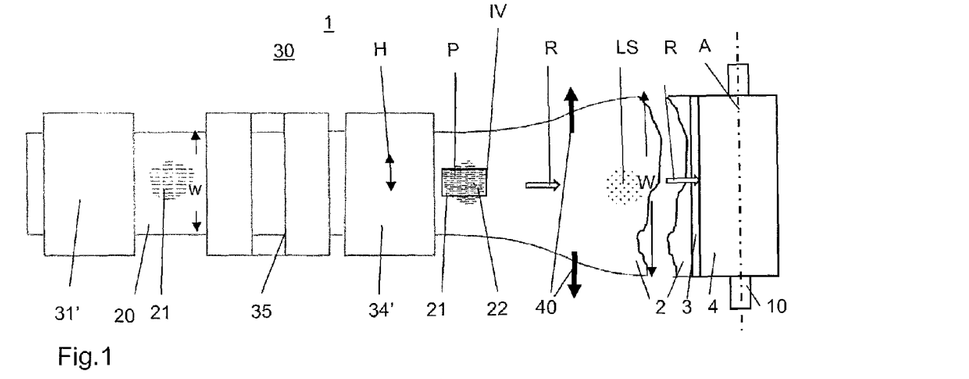
Figure 2:
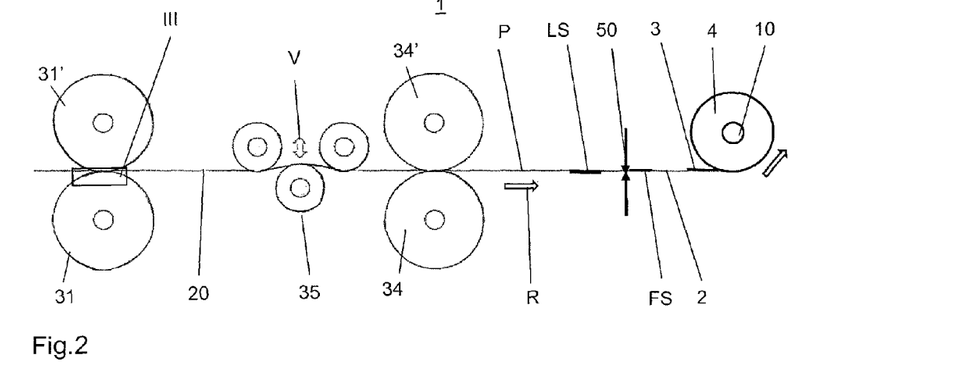
Figure 3:
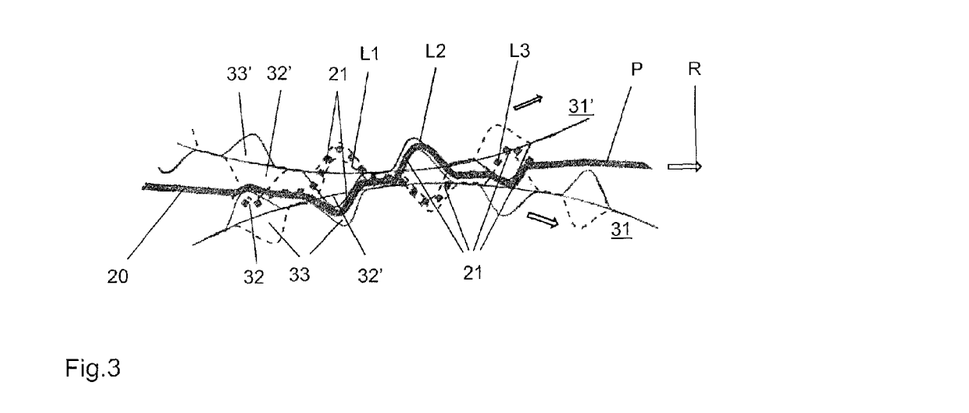

An arrangement 1 shown in FIGS. 1 to 3 is provided for manufacturing a resin-impregnatable spacer 2 of a condenser core for of a HV component, like a HV bushing.

The arrangement comprises a cylindrical member 10, which can be rotated around an axis A. The member 10 moves a tape 20 of an electrically insulating material in a running direction R. A typical material of the tape 20 is a paper, like kraft paper or aramide paper, an unwoven or woven synthetic fabric or a polymer foil, preferably based on polyester or poly-ethylene terephthalate (PET), but can also be based on a polyamide (PA), a semi-aromatic polyamide (aramide) or a polyimide. The member 10 can be realized as core of a coil (not shown in the figures) which simply gathers the windings of the tape 20. The coil can be stored and if required can be handled in an equipment for manufacturing the component, for instance as described in EP 1 1771 866 B1. As shown in the FIGS. 1 and 2 the member 10 can also be part of the afore-mentioned equipment for manufacturing the high-voltage component. The cylindrical member 10 then is realized as a mandrel and during forming a condenser core of the HV component receives the windings of the spacer 2 and also electrically conducting layers 3. Each of the layers 3 typically is in the form of a sheet of aluminium and is inserted at a defined diameter of the wound spacer 2 between successive windings of the spacer. The cylindrical member 10 together with a wound core 4 comprising the wound spacer 2 and the inserted layers 3 can be positioned in a gas-tight manner in a mould. The mould is provided for receiving a casting resin, like a filled or unfilled thermosetting resin, typically on the basis of an epoxy, and for hardening the resin and thereby forming the condenser core. The mandrel 10 can be a centrally arranged electrical conductor of the high-voltage component.

The arrangement 1 further comprises a cutting tool 30 for inserting a pattern P of parallel extended and equally sized cutting lines 21, 22 into the tape 20, a stretching tool 40 for expanding the tape 20 at right angle to the cutting lines 21, 22 and for forming a perforated three-dimensional lattice structure LS and a tool 50 for flattening the perforated three-dimensional lattice structure LS (merely shown in FIG. 2) by means of applying pressure and if required additionally temperature to lattice structure LS of the tape.

The cutting tool 30 comprises a pair of axially aligned cooperating cutting drums 31, 31' for inserting a plurality 21 of the cutting lines 21, 22 into the tape 20 which plurality of cutting lines 21 is shown in FIG. 1 on the left and in the pattern P. As shown in FIG. 3 the cutting drums 31 resp. 31' are designed as toothed wheels, wherein the teeth are realized as knives 32 resp. 32' and wherein any of the knives 32 of the toothed wheel 31 resp. any of the knives 32' of the toothed wheel 31' cooperates with one of second knives 33' resp. 33 which are arranged in tooth spaces of the other of the two toothed wheels. The cooperating knives 32 and 33' resp. 32' and 33 are distributed on the cylindrical outer surfaces of the cutting drums 31, 31' in axial and in circumferential direction.

The cutting tool 30 further comprises an equally designed pair of axially aligned cooperating cutting drums 34, 34' for inserting a plurality 22 of the cutting lines 21, 22 into the tape 20, which plurality is shown in FIG. 1 in the pattern P. The cutting lines 22 are identical in shape and arrangement with the cutting lines 21 but are shifted lengthwise and crosswise with respect to the cutting lines 21. The lengthwise shifting, that means the shifting in the running direction R, is achieved by means of three axially aligned cooperating drums 35 which can be shifted against each other in the vertical position as shown in FIG. 2 with an arrow V. The crosswise shifting, that means the shifting at right angle to the running direction R, is achieved with the pair of second drums 34, 34' which can be shifted in the axial direction as shown in FIG. 1 with an arrow H.

Figure 4:
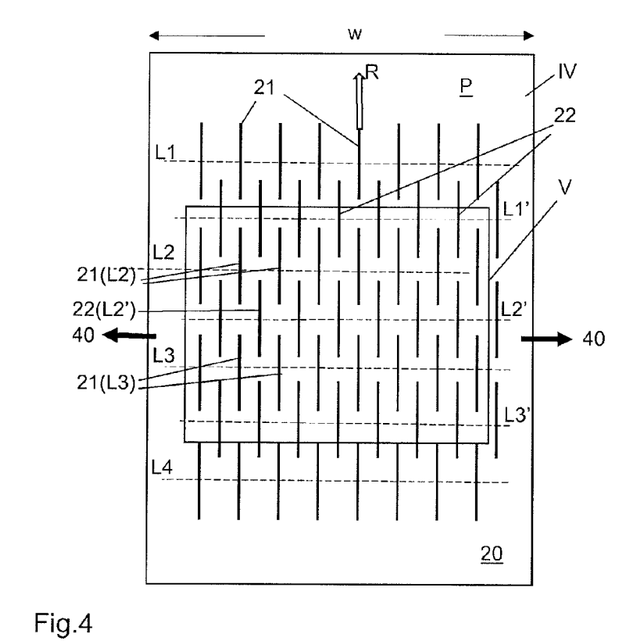

When the tape 20 is pulled in the running direction R the cooperating pairs of knives 32, 33' resp. 33, 32' of the cutting drums 31, 31' insert the cutting lines 21 into the tape 20. These cutting lines are aligned parallel to the running direction R and form a part of the pattern P shown in FIG. 1 on the left. The cutting lines 21 are inserted line by line with respect to the running direction R of the tape 20 and form first pattern lines. The first pattern lines are shown in FIG. 4 and are marked with L1, L2, . . . etc. The cutting lines 21 of any of the first pattern lines L1, L2, . . . etc. are spaced uniformly.

In order to complete the pattern P the cutting drums 34, 34' insert the plurality of cutting lines 22 into the tape 20. Also these cutting lines are inserted line by line with respect to the running direction R. The cutting lines 22 form second pattern lines L1', L2', . . . etc. Any of these second pattern lines, for instance pattern line L2', is arranged between two joining first pattern lines, for instance between pattern lines L2 and L3. The cutting lines 22 of any of the second pattern lines L1', L2', . . . etc. are spaced uniformly. Any cutting line 22 is arranged between two adjacent cutting lines 21 of each of two joining first pattern lines. For instance as shown in FIG. 4 a cutting line 22 (L2'), which belongs to the pattern line L2', is arranged between two adjacent cutting lines 21 (L2), which belong to the pattern line L2, and two adjacent cutting lines 21 (L3), which belong to the pattern line L3.

After the cutting of the pattern P the patterned tape 20 passes the stretching tool 40 and is expanded at right angle to the cutting lines 21, 22. The expansion (shown with two arrows) folds the patterned tape 20 and causes the formation of a spacer 2 with the afore-mentioned three-dimensional lattice structure LS. The cutting of the lines 21, 22 in the running direction R of the tape 20 and the expansion at right angle to the running direction R allows to increase the width W of the spacer 2 with respect to the width w of the tape 20. Thus the afore-described method allows the production of spacers 2 with different widths using only a tape with a smaller width and for this reason also allows the production of HV components with condenser cores with distinct lengths using only a tape 20 with a width that is smaller than the lengths of the condenser cores. This facilitates the production of the HV components remarkably and reduces the production costs essentially. Furthermore areas of joining two or more separate spacers with small width are avoided. With respect to the mechanical and the dielectrical properties of the HV component such areas are inferior to those in which only one spacer is used. Thus the HV component according to the invention comprises a high reliability. Furthermore during manufacturing a scrap rate due to tailoring an appropriate spacer from two or more different spacers is reduced.

Figure 5:
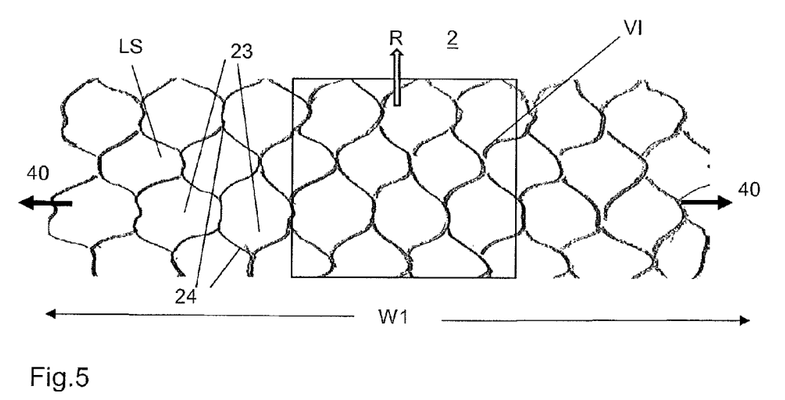

The embodiment of the spacer 2 shown in FIG. 5 comprises a three-dimensional lattice structure LS with comparatively large openings 23 which are bordered from material 24 of the cut, expanded and folded tape 20. The width W1 of the spacer 2 beats the width w of the tape 20 shown in FIGS. 2 and 4 a factor 2 to 3. Such a spacer is used in RIS technology where large openings in the spacer are required for impregnating the before-described wound condenser core 4 comprising the wound spacer 2 and the inserted control layers 3 in the mould with a filled resin, preferably on the basis of epoxy. Stacking such material on top of each other during winding will produce a structure easy to be impregnated, especially with a filled resin as used in the RIS technology. The material of the spacer 2 resp. of the tape 20 can be a polymer foil, in particular a polyester foil, more particularly a poly-ethylene terephthalate (PET) foil. A foil based on polyamide (PA), semi-aromatic polyamides (aramide) or polyimide can also be used. Densely woven or unwoven synthetic fabric can also be applied.

Figure 6:
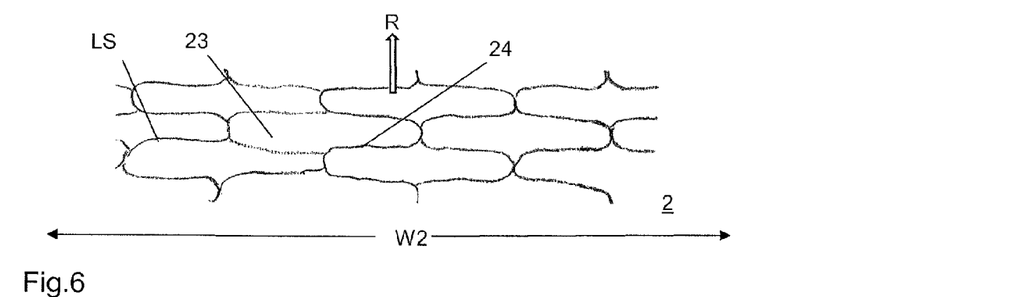

Another way of expanding the tape 20 and forming a second embodiment of the spacer 2 is shown in FIG. 6. In this example the tape 20 is expanded to the maximal possible width W2 which increases the width w of the tape 20 a factor 4 to 6. Such a spacer is useful for manufacturing HV components, like bushings, with a long condenser.

Figure 7:
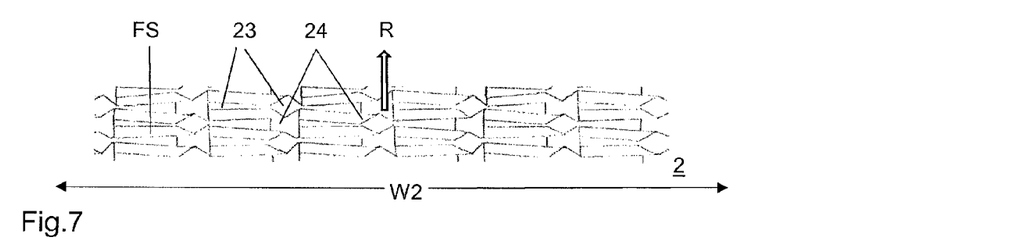

Flattening the three-dimensional lattice structure LS of the spacer according to FIG. 6 with the flattening tool 50 results in a third embodiment of the spacer 2 which is shown in FIG. 7. The third embodiment of the spacer 2 comprises a two-dimensional lattice structure FS with small openings 23 which are bordered from material 24 of the cut, expanded and flattened tape. The flattening step folds the material 24 of the three-dimensional structure LS and thus besides the openings 23 also forms narrow passages which are arranged between adjacent folds of the flattened material 24 and which are aligned at right angle to the radial direction. When such a spacer 2 is applied in a method for producing the high-voltage component, like a bushing, during impregnation of the wound core 24 with an unfilled resin the openings 23 distribute the resin radially within the windings of the spacer resp. within the wound core 4. The narrow passages distribute the resin within the windings of the spacer 2 resp. within the wound core 4 in the axial direction and in all other directions which are at right angle to the radial direction. Such a flat spacer 2 can particularly be used in RIP technology or another technology in which the wound condenser core 4 is impregnated with an unfilled resin. The material of the tape 20 resp. the tape 20 can be kraft paper, aramide paper or an unwoven or woven synthetic fabric. The use of a flattened spacer 2 with the two-dimensional lattice structure FS gives a significant cost advantage with respect to the usually used crepe paper. Such a spacer is much thinner than a spacer based on a standard crepe paper, even though allowing the resin penetration during impregnation. This results in an increased volume fraction of the paper in the RIP material and gives both cost advantage and processing advantage resulting from less exothermal heat release.

The properties of the afore-described embodiments of the spacer 2 can be improved when before the execution of the expansion and/or the flattening step the tape 20 is adjusted to a temperature which allows a plastic deformation of the tape material.

Figure 8:
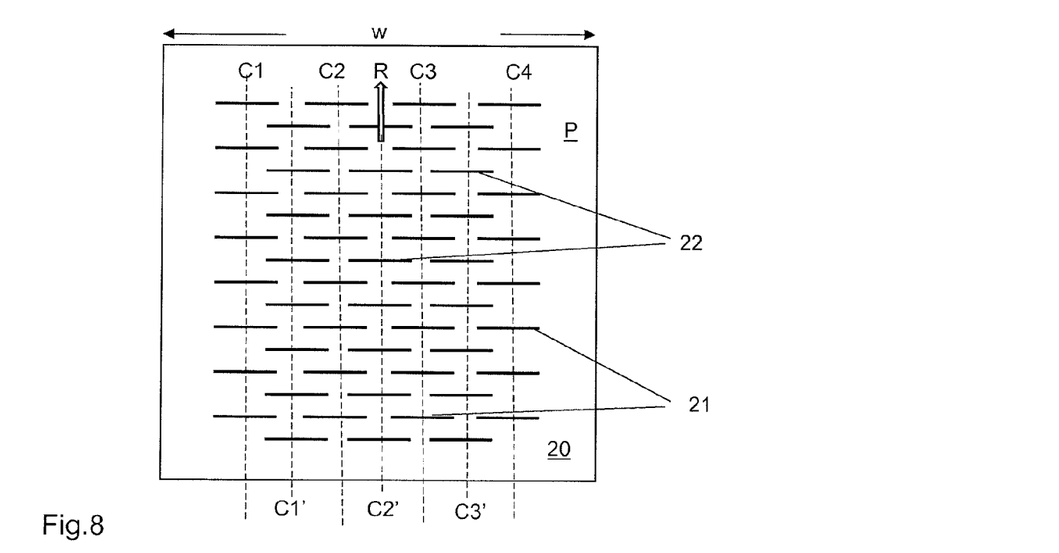

Instead of cutting the pattern P with the two pairs of drums 31, 31' and 34, 34' the cutting can also be realized with only one pair of cutting drums 31, 31' or with a laser. Furthermore the pattern P can also be cut at right angle to the running direction R of the tape 20 and the cut tape 20 can be expanded in the running direction. A tape 20 comprising such a pattern P is shown in FIG. 8. In the shown tape the cutting lines 21, 22 are inserted at right angle to the running direction R. A first plurality 21 of the cutting lines 21, 22 is inserted column by column with respect to the running direction R of the tape 20 and forms first pattern columns C1, C2, . . . etc. The cutting lines 21 of any of the first pattern columns, for instance C1, are spaced uniformly. A second plurality 22 of the cutting lines 21, 22 are inserted column by column with respect to the running direction R of the tape 20 and forms second pattern columns C1', C2', . . . etc. Any of the second pattern columns, for instance C2', is arranged between two joining first pattern columns, for instance C2 and C3. Any cutting line 22 is arranged between two adjacent cutting lines 21 of each of two joining first pattern columns. For instance as shown in FIG. 8 a cutting line 22, which belongs to the pattern column C2', is arranged between two adjacent cutting lines 21, which belong to the first pattern column C2, and two adjacent cutting lines 21, which belong to the first pattern column C3.

Figure 9:
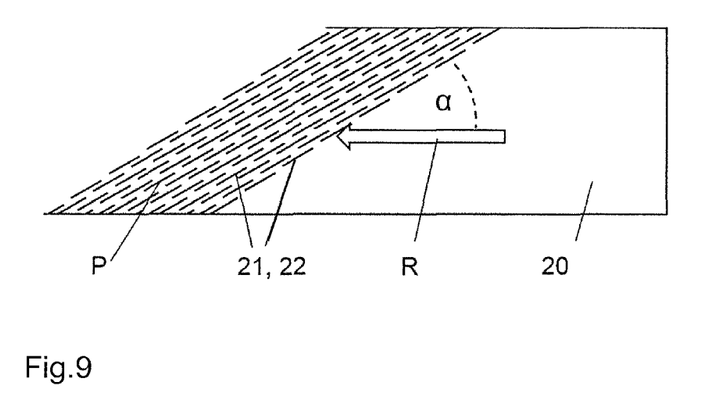

As shown in FIG. 9 the cutting lines 21, 22 of the pattern P can also be inserted at an angle α exceeding 0°, preferably 10°, and being less than 90°, preferably 60°, wherein α defines the angle between the running direction R of the tape 20 and the extension of the cutting lines. The patterned tape 20 passes a guide (not shown) which is aligned in parallel to the cutting lines 21, 22 and which can be realized as a roll with an axis arranged in parallel to the cutting lines. The tape 20 changes its running direction R and after passing the guide moves downward with respect to the plane figure (no more shown in the FIG. 9). The deflected section (not shown) of the tape is expanded perpendicular to its (upwardly aligned) running direction in order to form the three-dimensional lattice structure FS (not shown in FIG. 9). The lattice structure of the patterned tape according to FIG. 8 can be formed in the same manner.

Tapes 20 based on polymer material can be cut at room temperature or at high temperature. In the second case the temperature is adjusted so that the material of the tape is plastic. In such a case the material 24 forming the bridges of the lattice can be physically expanded during cutting.

During execution of the steps, like cutting and expanding and if required also like flattening the tape 20, the tape can be adjusted to a temperature which prevents any further plastic deformation. This can be achieved with cooling, for instance in a bath. The resulting spacer 2 can be wound on a cylindrical spacer carrier or can immediately used for the producing the wound core 3.

LIST REFERENCE SIGNS 1 manufacturing arrangement
2 spacer
3 electrically conducting layers
4 wound core
10 cylindrical member
20 electrically insulating tape
21, 22, 21(L2), 21(L3), 22(L2') cutting lines
23 openings
24 material of the tape 20
30 cutting tool
31, 31' cutting drums
32, 32', 33, 33' knives
34, 34' cutting drums
35 shifting drums
40 stretching tool
50 flattening tool
A axis
C1, C2, C3, . . . first pattern column
C1', C2', C3', . . . second pattern columns FS two-dimensional lattice structure
H arrow showing a horizontal shifting
L1, L2, L3, . . . first pattern lines
L1', L2', L3', . . . second pattern lines
LS three-dimensional lattice structure
P pattern
R arrow showing running direction of the tape 20
V arrow showing a vertical shifting
W, W1, W2 width of the spacer
width of the tape 20
α angle between cutting lines and running direction

The invention claimed is:

1. A method for manufacturing a perforated, sheet-like high-voltage insulating spacer for a high-voltage component comprising a field grading condenser core with the spacer which is wound in spiral form around an axis, with electrically conducting layers which are inserted between successive windings of the spacer, and with a polymeric matrix which penetrates the spacer and which embeds the spacer and the layers, wherein
an electrically insulating tape is moved in a running direction, that a pattern of parallel extended cutting lines is inserted into the tape, and
the patterned tape is expanded at right angle to the cutting lines in order to form a spacer with a perforated three-dimensional lattice structure,
wherein the perforated three-dimensional structure is flattened to form the spacer having a perforated two-dimensional structure.

2. The method according to claim 1, wherein the material of the spacer is configured to withstand the formation of partial discharges in an electrical field of at least 2 kV/mm.

3. The method according to claim 1, wherein the cutting lines are inserted parallel to the running direction of the tape.

4. The method according to claim 3, wherein a first plurality of the cutting lines is inserted line by line with respect to the running direction of the tape and forms first pattern lines, wherein the cutting lines of any of the first pattern lines are spaced uniformly.

5. The method according to claim 4, wherein a second plurality of the cutting lines is inserted line by line with respect to the running direction of the tape and forms second pattern lines, wherein any of the second pattern lines is arranged between two joining first pattern lines, wherein the cutting lines of any of the second pattern lines, are spaced uniformly, and wherein at least one cutting line of the second plurality of the cutting lines is arranged between two adjacent cutting lines of each of two joining first pattern lines.

6. The method according to claim 1, wherein the cutting lines are inserted at right angle to the running direction of the tape.

7. The method according to claim 6, wherein a first plurality of the cutting lines is inserted column by column with respect to the running direction of the tape and forms first pattern columns wherein the cutting lines of any of the first pattern columns are spaced uniformly.

8. The method according to claim 7, wherein a second plurality of the cutting lines is inserted column by column with respect to the running direction of the tape and forms second pattern columns, wherein any of the second pattern columns is arranged between two joining first pattern columns, wherein the cutting lines of any of the second pattern columns are spaced uniformly, and wherein at least one of the second plurality of the cutting lines is arranged between two adjacent cutting lines of each of two joining first pattern columns.

9. The method according to claim 1, wherein the cutting lines are inserted at an angle (a) exceeding 0° and less than 90° with respect to the running direction of the tape.

10. The method according to claim 1, wherein before flattening the perforated three-dimensional structure the tape is expanded to a maximum admissible elongation with respect to the running direction or at right angle to the running direction.

11. The method according to claim 1, wherein before the execution of at least one of the steps comprising cutting the tape, expanding the tape and flattening the three-dimensional lattice structure, the tape is adjusted to a temperature which allows a plastic deformation of the tape material.

12. The method according to claim 11, wherein after the execution of the last of the steps the tape is adjusted to a temperature which prevents any further plastic deformation.

13. The method according to claim 1, wherein the cutting lines are inserted at an angle (a) exceeding 10° and being less than 60° with respect to the running direction of the tape.

14. The method according to claim 2, wherein the cutting lines are inserted parallel to the running direction of the tape.

15. The method according to claim 2, wherein the cutting lines are inserted at right angle to the running direction of the tape.

16. A high-voltage component comprising a field grading condenser core with a perforated, sheet-like high-voltage insulating spacer, which is wound is spiral form around an axis, with electrically conducting layers which are inserted between successive windings of the spacer, and with a polymeric matrix which penetrates the spacer and which embeds the spacer and the layers, the spacer comprises an electrically insulating tape with a pattern of parallel extended cutting lines in the tape, and the tape is expanded at right angle to the cutting lines to form a perforated three-dimensional lattice structure wherein
the three-dimensional lattice of the spacer comprises openings, which are bordered with the material of a cut and expanded tape, and that the polymeric matrix is based on a hardened polymeric resin with an inorganic filler with an average particle size which is smaller than the average size of the openings provided in the three-dimensional lattice structure, wherein the tape is adjusted to a temperature which allows a plastic deformation of the tape material before cutting the tape, expanding the tape or flattening the three-dimensional lattice structure, or
the spacer comprises a two-dimensional lattice structure with openings, which are sized smaller than the openings in the three-dimensional lattice structure and which are bordered with the material of a cut, expanded and flattened tape, and that the polymeric matrix is based on a hardened unfilled polymeric resin.

17. The high-voltage component according to claim 16, wherein the spacer with the three-dimensional lattice structure is manufactured from at least one of a polymer foil or a densely woven or unwoven synthetic fabric.

18. The high-voltage component according to claim 16, wherein the spacer with the two-dimensional lattice structure is manufactured from at least one of a paper or a woven or unwoven synthetic fabric.

19. The high-voltage component according to claim 16, wherein the spacer with the two-dimensional lattice structure further comprises passages which are arranged between adjacent foldings of flattened material of the tape and which are aligned at right angle to the radial direction.

20. A method for manufacturing a perforated, sheet-like high-voltage insulating spacer for a high-voltage component comprising a field grading condenser core with the spacer which is wound in spiral form around an axis, with electrically conducting layers which are inserted between successive windings of the spacer, and with a polymeric matrix which penetrates the spacer and which embeds the spacer and the layers, wherein an electrically insulating tape is moved in a running direction, that a pattern of parallel extended cutting lines is inserted into the tape, and the patterned tape is expanded at right angle to the cutting lines in order to form a spacer with a perforated three-dimensional lattice structure, wherein before the execution of at least one step comprising of cutting the tape, expanding the tape and flattening the three-dimensional lattice structure, the tape is adjusted to a temperature which allows a plastic deformation of the tape material.

* * * * *